United States Patent [19]

Matsuoka et al.

[11] Patent Number: 4,611,832

[45] Date of Patent: Sep. 16, 1986

[54] HOSE JOINT

[75] Inventors: Mitsuyuki Matsuoka; Masanobu Ohnishi, both of Komaki, Japan

[73] Assignee: Tokai Rubber Industries Ltd., Komaki, Japan

[21] Appl. No.: 590,858

[22] Filed: Mar. 19, 1984

[30] Foreign Application Priority Data

Mar. 26, 1983 [JP] Japan ................................ 58-51306

[51] Int. Cl.$^4$ ............................................. F16L 33/01
[52] U.S. Cl. ..................................... 285/55; 285/242; 285/252; 285/256; 285/259; 285/919; 118/DIG. 11
[58] Field of Search ................. 285/55, DIG. 20, 242, 285/243, 252, 253, 256, 420, 259; 138/145, 146; 118/DIG. 11; 427/195

[56] References Cited

U.S. PATENT DOCUMENTS

| 3,090,696 | 5/1963 | Gemmer | 427/195 |
|---|---|---|---|
| 3,146,142 | 8/1964 | Maly | 285/423 |
| 3,472,536 | 10/1969 | Ingram | 285/253 |
| 3,865,662 | 2/1975 | Segal | 285/21 |
| 3,944,453 | 3/1976 | Chudgar et al. | 156/143 |
| 3,951,438 | 4/1976 | Scales | 285/55 |
| 4,019,761 | 4/1977 | Heidemann | 285/47 |
| 4,163,030 | 7/1979 | Banucci et al. | 427/195 |
| 4,289,172 | 9/1981 | Ekström | 138/140 |
| 4,330,017 | 4/1982 | Satoh et al. | 138/126 |
| 4,364,210 | 12/1982 | Fleming et al. | 285/187 |
| 4,457,542 | 7/1984 | Shaffer et al. | 285/55 |
| 4,481,239 | 11/1984 | Eckner | 138/DIG. 7 |
| 4,500,577 | 2/1985 | Satake et al. | 138/145 |

FOREIGN PATENT DOCUMENTS 33120 3/1977 Japan ........................... 138/DIG. 7

OTHER PUBLICATIONS

"The Modern plastics Encyclopedia", 1954, p. 399.

Primary Examiner—Cornelius J. Husar
Assistant Examiner—Eric K. Nicholson
Attorney, Agent, or Firm—Anthony J. Casella; Gerald E. Hespos

[57] ABSTRACT

A thermosetting resin layer covers the outer peripheral surface of the nipple portion of a joint provided on one end of a connecting pipe. A hose having a reinforcing layer between a single- or double-layer inner tube and an outer tube is inserted over the nipple portion of the joint, and tightened by a caulked sleeve or clamp encircling the hose to form a joint structure. This joint structure provides a satisfactory seal for a long period of time, as its resin layer does not undergo any crystallization, but maintains elasticity.

6 Claims, 4 Drawing Figures

HOSE JOINT

BACKGROUND OF THE INVENTION

1. Field of the Invention

This invention relates to a hose joint. More particularly, it is concerned with a joint structure defined between a hose for, for example, an automotive fuel or lubricant line and a joint provided on one end of a connecting pipe and having an outer nipple surface covered by a thermosetting resin layer.

2. Description of the Prior Art

A conventional hose for a fuel line is fragmentarily shown at 1 in FIG. 1 by way of example. The hose 1 comprises an inner tube 2 formed from fluorine rubber (FKM) or a mixture of acrylonitrile-butadiene rubber and polyvinyl chloride (NBR/PVC), a reinforcing layer 3 formed from braided vinylon, polyester, polyamide, rayon or aromatic polyamide fiber and surrounding the inner tube 2, and an outer tube 4 formed from epichlorohydrin rubber (CHC), chlorosulfonated polyethylene rubber (CSM), chlorinated polyethylene rubber (CPE), acrylic rubber (ACM) including a copolymer of ethylene, vinyl acetate and acrylic ester, or chloroprene rubber (CR) and surrounding the reinforcing layer 3. The inner tube 2, reinforcing layer 3 and outer tube 4 are joined to one another by an adhesive. Another conventional hose is shown at 1 in FIG. 2, and includes an inner tube 2 which consists of an inner layer 2' and an outer layer 2". The inner layer 2' is formed from the same material as that from which the inner tube 2 in the hose of FIG. 1 is formed. The outer layer 2" is formed from acrylonitrilebutadiene rubber (NBR), epichlorohydrin rubber, acrylic rubber including a copolymer of ethylene, vinyl acetate and acrylic ester, chlorosulfonated polyethylene rubber or chlorinated polyethylene rubber. The inner and outer layers 2' and 2" are joined together by vulcanization. The hose 1 also includes a reinforcing layer 3 and an outer tube 4 which are formed from the same material as those from which the reinforcing layer 3 and the outer tube 4 in the hose of FIG. 1 are, respectively, formed. The inner tube 2, reinforcing layer 3 and outer tube 4 are joined to one another by an adhesive. These hoses are disclosed in U.S. Pat. No. 4,330,017 to Satoh et al. and U.S. Pat. No. 3,944,453 to Chudgar et al., respectively.

A hose of such construction is connected to a hose joint provided on one end of a connection pipe. There is known a hose joint having a nipple which carries an adhesive layer on its outer peripheral surface. The nipple is inserted into one end of the hose, and a sleeve is placed around the hose end. The sleeve is caulked, whereby the hose end is tightly held between the nipple and the sleeve. The hose and the nipple are joined to each other by the adhesive layer provided on the outer surface of the nipple. This joint structure provides a satisfactory seal which prevents the leakage of a fluid, such as fuel oil or lubricant, through the boundary between the hose and the nipple. It has, however, a number of drawbacks, too, as will hereinafter be pointed out.

This joint structure essentially requires the adhesion between the inner surface of the hose end and the outer surface of the nipple. The adhesion usually requires a special step, whether it may be carried out at an ambient or elevated temperature. A lot of labor and cost are required for the selection of an appropriate adhesive, its quality control and the control for the entire process for the production of the hose joints. More specifically, it is necessary to choose an appropriate adhesive which suits the material of a particular hose. It is most advisable to employ an adhesive (or rubber cement) which consists of the same material as the innermost layer of the hose, for example, an adhesive (or rubber cement) consisting of an acrylonitrile-butadiene rubber composition for a hose having an inner tube (2 in FIG. 1) or inner layer (2' in FIG. 2) formed from an acrylonitrile-butadiene rubber composition, or an adhesive (or rubber cement) consisting of a fluorine rubber composition for a hose having an inner tube or layer formed from a fluorine rubber composition. Various kinds of adhesives (or rubber cements) are, therefore, required. Moreover, it is usually necessary to use a primer, since those adhesives (or rubber cements) are unsuitable for bonding a rubber hose direcly to a nipple which is usually made of steel. Thus, a lot of money and labor are required for the quality control of the adhesives and the primers and the control for the entire production process.

In the event the step of adhesion involves heating, it is likely to give to a number of problems, including the deterioration of the reinforcing fiber layer 3 which is usually disposed between the inner and outer tubes 2 and 4 of the hose 1, and the failure to obtain any acceptable adhesive strength as a result of the separation of the adhesive layer from the outer surface of the nipple when it is inserted into the hose.

Moreover, it is likely that the hose may be inadvertently separated from the joint during regular inspection or repairs after certain periods of use on an automobile, especially if the hose is clamped to the joint. In any such event, it is no longer possible to recover any satisfactory connection, even if the joint may be inserted into the hose. Thus, it has hitherto been impossible to obtain any maintenance-free hose joint structure.

SUMMARY OF THE INVENTION

It is an object of this invention to provide a reusable hose joint.

It is another object of this invention to provide a joint structure between a hose and a joint on a connecting pipe which provides a satisfactory seal in a very wide temperature range of, say, below −40° C. to above 100° C., especially in a low temperature range, and which is maintenance-free.

This invention is essentially characterized by the provision of a thermosetting resin layer covering the outer peripheral surface of the nipple portion of a joint provided on one end of a connecting pipe of steel or other material.

DETAILED DESCRIPTION OF THE INVENTION

Figure 1:
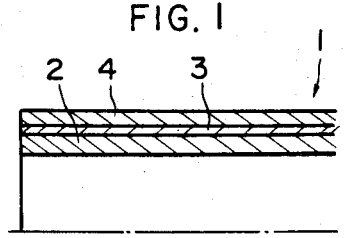
FIG. 1 is a fragmentary longitudinal sectional view of a conventional hose.
Figure 2:
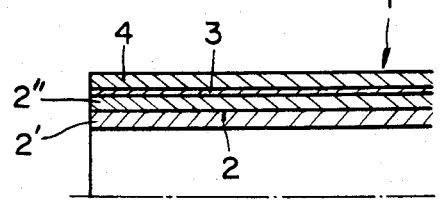
FIG. 2 is a view similar to FIG. 1, but showing another conventional hose.
Figure 3:
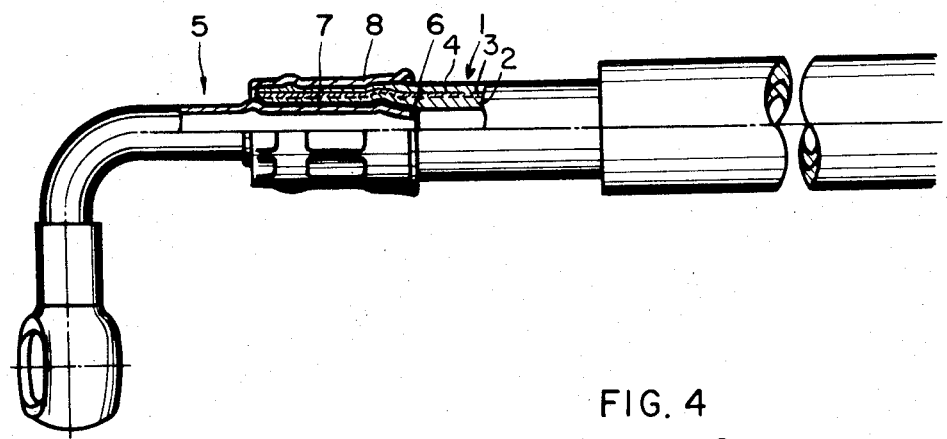
FIG. 3 is a longitudinal elevational view, partly in section, of a joint structure embodying this invention.
Figure 4:
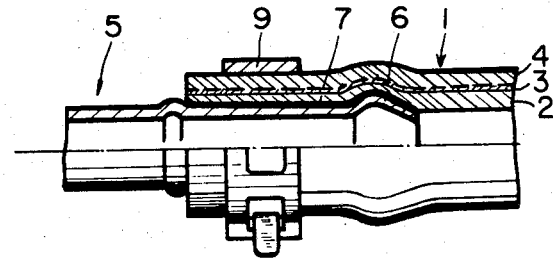
FIG. 4 is a longitudinal elevational view, partly in section, of another structure embodying this invention.

Referring to FIGS. 3 and 4, a connecting pipe, such as a steel pipe, has a joint 5 provided at one end thereof and having a nipple portion 6 formed by, for example, bulging, and a covering layer 7 is provided on the outer peripheral surface of the nipple portion 6. The covering layer 7 is composed of a phenolic, unsaturated polyester, or polyurethane resin, or a thermosetting resin consisting mainly of any such resin. It has a thickness of 5 to 100 microns, preferably 10 to 90 microns. The layer may be formed by a variety of methods, for example, by applying a solution of any such resin to the outer peripheral surface of the nipple portion of at least once by dipping or spraying or with a brush, drying it and baking the resin at a temperature of, say, 100° to 150° C. for, say, 10 to 60 minutes so that it may firmly adhere to the nipple surface. The preliminary treatment of the outer peripheral surface of the nipple portion 6 may be effective to ensure the adhesion of the layer 7 thereto. A hose 1 is not shown in detail in FIG. 3 or 4, but may be of the construction hereinbefore described in detail with reference to FIG. 1 or 2. The nipple portion 6 of the joint 5 is inserted into one end of the hose 1 and connected therewith by, for example, a sleeve 8 caulked about the hose end as shown in FIG. 3, or a clamp 9 as shown in FIG. 4.

The joint structure of this invention, therefore, does not rely on any adhesive bonding between the nipple 6 and the hose 1. It is, therefore, a maintenance-free joint structure which provides a satisfactory seal in a very wide temperature range of, say, below −40° C. to above 100° C., especially in a low temperature range. This is due to the presence of the thermosetting resin layer 7 between the hose 1 and the joint 5. The layer 7 exhibits the elasticity and rigidity which lie between those of rubber (hose) and those of metal (joint) in a wide temperature range, and even if the inner tube 2 of the hose 1 or the inner layer 2' of the inner tube 2 is crystallized at a very low temperature, for example, −40° C., the layer 7 does not undergo any crystallization and hardening to form a rigid body, and does not, therefore, show any shrinkage or loss of elasticity that would arise from crystallization. The layer 7 always maintains a sufficient contact pressure between the hose 1 and the nipple 6 to achieve a satisfactory seal therebetween.

No thermoplastic resin can be used for the layer 7, since the thermoplastic resin usually has a high tendency toward crystallization at a low temperature, and since a polystyrene or other thermoplastic resin which does not undergo crystallization is highly liable to plastic deformation under heat. No rubber can be used to form the layer 7, either, since fluorine rubber is poor in cold resistance and undergoes hardening and shrinkage by crystallization at a low temperature, though it is excellent in fuel oil and lubricant resistance, while general-purpose rubber is inferior in fuel oil and lubricant resistance despite its excellent cold resistance.

It is essential for the layer 7 to be formed from a material withstanding fuel oil and lubricant. While various materials are available for different specific applications, it is usually preferable to use a phenolic resin or a thermosetting resin consisting mainly of a phenolic resin.

The invention will now be described more specifically with reference to several examples thereof and comparative examples.

EXAMPLE 1

The outer peripheral surface of the nipple portion of a joint provided on one end of a zinc chromated steel pipe was washed with 1,1,1-trichloroethane and dipped in a methyl ethyl ketone solution containing 20% by weight of a phenolic resin composition containing an appropriate amount of a curing agent. After the solution had been left to dry at an ambient temperature, it was baked at 120° C. for 30 minutes to form a thermosetting phenolic resin layer having a thickness of 10 microns on the outer peripheral surface of the nipple portion.

An attempt was made to connect the joint to a hose for a fuel line having an inner tube consisting of an inner layer formed from a fluorine rubber composition and an outer layer formed from a composition of acrylonitrile-butadiene rubber containing 35% by weight of acrylonitrile, while its reinforcing layer surrounding the outer layer of the inner tube was of vinylon fiber, and its outer tube surrounding the reinforcing layer was of an epichlorohydrin rubber composition. One end of the hose was inserted between the nipple portion and a sleeve encircling it, and the outer periphery of the sleeve was caulked to connect the hose to the joint.

EXAMPLE 2

The procedures of EXAMPLE 1 were repeated for the preparation of a joint and its connection to a hose, except that a resin layer having a thickness of 50 microns was formed.

EXAMPLE 3

The procedures of EXAMPLE 1 were repeated for the preparation of a joint and its connection to a hose, except that a resin layer having a thickness of 90 microns was formed.

EXAMPLE 4

The procedures of EXAMPLE 1 were repeated for the preparation of a joint and its connection to a hose, except that the outer layer of the inner tube of the hose was formed from epichlorohydrin rubber.

EXAMPLE 5

The procedures of EXAMPLE 1 were repeated for the preparation of a joint and its connection to a hose, except that the outer layer of the inner tube of the hose and its outer tube were both formed from acrylic rubber.

EXAMPLE 6

The procedures of EXAMPLE 1 were repeated for the preparation of a joint and its connection to a hose, except that the outer layer of the inner tube of the hose and its outer tube were both formed from chlorosulfonated polyethylene rubber.

EXAMPLE 7

The procedures of EXAMPLE 1 were repeated for the preparation of a joint and its connection to a hose, except that the inner layer of the inner tube of the hose was formed from a mixture of 40% by weight of acrylonitrile-butadiene rubber having an acrylonitrile content of 41% by weight, and 60% by weight of polyvinyl chloride.

EXAMPLE 8

The procedures of EXAMPLE 1 were repeated for the preparation of a joint and its connection to a hose, except that the hose had an inner tube formed in a single layer from fluorine rubber.

EXAMPLE 9

The procedures of EXAMPLE 1 were repeated for the preparation of a joint and its connection to a hose, except that the hose had an inner tube formed in a single layer from hydrogenated acrylonitrile-butadiene rubber (H—NBR) having an acrylonitrile content of 45% by weight and a hydrogen content of 90%.

COMPARATIVE EXAMPLE 1

The procedures of EXAMPLE 1 were repeated for the preparation of a joint and its connection to a hose, except that no resin layer was formed on the outer peripheral surface of the nipple.

COMPARATIVE EXAMPLE 2

The procedures of EXAMPLE 1 were repeated for the preparation of a joint and its connection to a hose, except that a thermoplastic resin layer composed of a polyamide resin known as Nylon 66 and having a thickness of 50 microns was formed on the outer peripheral surface of the nipple.

Sealing tests were conducted under various conditions on the hoses connected to the joints as hereinabove described in the EXAMPLES and COMPARATIVE EXAMPLES. The test results are shown in TABLE 1. The tests were conducted by closing one end of the joint and introducing nitrogen gas having a pressure of 20 kg/cm² into the joint structure through one end of the hose to see if any nitrogen gas would leak out. Twenty sample joint structures were prepared in accordance with each of the EXAMPLES and COMPARATIVE EXAMPLES, and tested under various conditions as shown in TABLE 1. Each of the numerals indicating the test results in TABLE 1 is the percentage of the samples from which no nitrogen gas leaked. Tests #4 were conducted at −35° C. after six months of circulation through each sample involved of gasoline having a pressure of 2.5 kg/cm² and a temperature of about 40° at an ambient temperature of 60° C.

TABLE 1

Results of Sealing Tests

| | | Comparative Examples | | Examples | | | | | | | | |
|---|---|---|---|---|---|---|---|---|---|---|---|---|
| | | 1 | 2 | 1 | 2 | 3 | 4 | 5 | 6 | 7 | 8 | 9 |
| Joint (nipple) | Covering layer | | thermoplastic polyamide resin | thermosetting phenolic resin | ← | ← | ← | ← | ← | ← | ← | ← |
| | Its thickness (μ) | | 50 | 10 | 50 | 90 | 10 | ← | ← | ← | ← | ← |
| Hose | Inner tube | | | | | | | | | | | |
| | Inner layer | FKM | FKM | FKM | FKM | FKM | FKM | FKM | FKM | NBR/PVC | FKM | H-NBR |
| | Outer layer | NBR | NBR | NBR | NBR | NBR | CHC | ACM | CSM | NBR | | |
| | Outer tube | CHC | CHC | CHC | CHC | CHC | CHC | ACM | CSM | CHC | CHC | CHC |
| Sealing tests n = 20 | Test #1 Blank test at 80° C. | 100 | 100 | 100 | 100 | 100 | 100 | 100 | 100 | 100 | 100 | 100 |
| | Test #2 Blank test at −35° C. | 50 | 80 | 100 | 100 | 100 | 100 | 100 | 100 | 100 | 100 | 100 |
| | Test #3 Conducted at −35° C. after thermal aging* | 25 | 50 | 100 | 100 | 100 | 100 | 100 | 100 | 100 | 100 | 100 |
| | Test #4 Conducted at −35° C. after calculation of gasoline under pressure | | | 100 | 100 | 100 | 100 | 100 | 100 | 100 | 100 | 100 |

*At 120° C. for 288 hours

As is obvious from the test results, the joint structure of this invention provides an excellent seal in a wide temperature range, especially at a low temperature. Moreover, as it does not rely on any adhesive bonding between the nipple and the hose, it provides a practically useful, maintenance-free hose joint structure which is simple to manufacture without incurring any substantial labor and expenditure for the control of the production process.

Although the invention has been described by way of example with reference to its application to hoses for a fuel line having an innermost layer formed from a fluorine rubber composition, it is also useful for a variety of other applications, including its application to a hose for a lubricant line having an innermost layer formed from an acrylonitrile-butadiene rubber composition.

What is claimed is:

1. A reusable non-adhesive hose joint structure for an automotive fuel line comprising:
    a hose comprising an inner tube, a reinforcing layer surrounding said inner tube, and an outer tube surrounding said reinforcing layer, said inner tube of said hose comprising at least an inner layer comprised of fluorine rubber;
    a hose joint provided on one end of a connecting pipe and having a metallic nipple portion coated with a thermosetting resin which comprises phenolic resin, said thermosetting resin being free if crystallization at temperatures at least as low as −40° C., said nipple portion being disposed within said end of said hose such that said thermosetting resin of said nipple and said fluorine rubber of said hose are disposed in face-to-face contact; and
    a member provided around said hose adjacent to said one end thereof for urging said hose in a generally radially inward direction toward said nipple portion, whereby the face-to-face contact between the thermosetting resin and the fluorine rubber provides a maintenance free non-adhesive reusable seal that is effective between −40° C. and 100° C.

2. A joint structure as set forth in claim 1, wherein said resin layer has a thickness of 5 to 100 microns.

3. A joint structure as set forth in claim 2, wherein, said thickness is from 10 to 90 microns.

4. A joint structure as set forth in claim 1, wherein said reinforcing layer is a layer of braided fiber.

5. A joint structure as set forth in claim 1, wherein outer layer that is formed from rubber selected from the group consisting of acrylonitrile-butadiene rubber, epichlorohydrin rubber, acrylic rubber, chlorosulfonated polyethylene rubber and chlorinated polyethylene rubber.

6. A hose joint structure for an automotive fuel line comprising:

a hose having an inner tube, a reinforcing layer surrounding said tube and an outer tube surrounding said reinforcing layer, said inner tube including an inner layer comprised of fluorine rubber;

a metallic nipple having opposed inner and outer surfaces, said outer surface being coated with a thermosetting resin comprising phenolic resin, said thermosetting setting having a thickness of between 10 microns and 90 microns and being securely formed on said nipple by baking the coated nipple at a temperature of between 120° C. and 150° C. for between 10 minutes and 60 minutes, said resin being characterized by being free of crystallization at temperatures equal to or above −40° C. and having an elasticity and a rigidity between those of the fluorine rubber and the metallic nipple, said coated nipple being disposed in said hose such that the phenolic resin is disposed in face-to-face contact with the fluorine rubber of the inner layer of the hose; and a member provided around said hose adjacent to the nipple, said member being operative to urge said hose in a generally radially inward direction toward said nipple, whereby the face-to-face contact between the phenolic resin and the fluorine rubber provides a maintenance free non-adhesive reusable seal that is effective between the temperatures of −40° C. and 100° C.

* * * * *